United States Patent
Burcher et al.

[11] 3,710,122
[45] Jan. 9, 1973

[54] LASER COMMUNICATION SYSTEM FOR CONTROLLING SEVERAL FUNCTIONS AT A LOCATION REMOTE TO THE LASER

[75] Inventors: Ernest E. Burcher, Newport News, Va. 23602; Carroll W. Rowland, Archiblad R. Sinclair, Hampton, Va. 23366

[73] Assignee: The United States of America as represented by the Administrator of the National Aeronautics and Space Administration

[22] Filed: April 24, 1970

[21] Appl. No.: 31,702

[52] U.S. Cl. .................. 250/199, 340/171, 350/293
[51] Int. Cl. ............................. H04b 9/00, G02b 5/10
[58] Field of Search ...... 250/199, 216, 227; 340/189, 340/171; 350/198, 199, 293-295, 296; 178/DIG. 15

[56] References Cited

UNITED STATES PATENTS

| | | |
|---|---|---|
| 3,121,169 | 2/1964 | Benton .................................. 250/199 |
| 3,226,557 | 12/1969 | Goodman ............................. 350/198 |
| 3,551,676 | 12/1970 | Runnels ................................ 350/198 |
| 3,551,682 | 12/1970 | Kerhoas ............................... 250/227 |
| 3,562,540 | 2/1971 | Hirsch ................................... 250/227 |
| 3,189,744 | 6/1965 | Ogland .................................. 250/199 |
| 3,341,707 | 9/1967 | Wingfield et al. ..................... 250/199 |
| 3,471,833 | 10/1969 | Whitaker ............................... 340/171 |
| 3,432,766 | 3/1969 | Morantz ......................... 350/198 UX |
| 3,379,887 | 4/1968 | Stephany .............................. 250/199 |
| 3,503,061 | 3/1970 | Bray et al. ............................. 250/199 |
| 3,383,511 | 5/1968 | Palser ............................ 350/199 UX |

Primary Examiner—Robert L. Griffin
Assistant Examiner—Joseph A. Orsino, Jr.
Attorney—Howard J. Osborn, William H. King and John R. Manning

[57] ABSTRACT

A multichannel laser remote control system for use in areas where radio frequency, acoustic and hardwire control systems are unsatisfactory or prohibited and where line-of-sight is unobstructed. A modulated continuous wave He-Ne laser is used as the transmitter and a unique 360° light collector serves as the antenna at the receiver.

4 Claims, 4 Drawing Figures

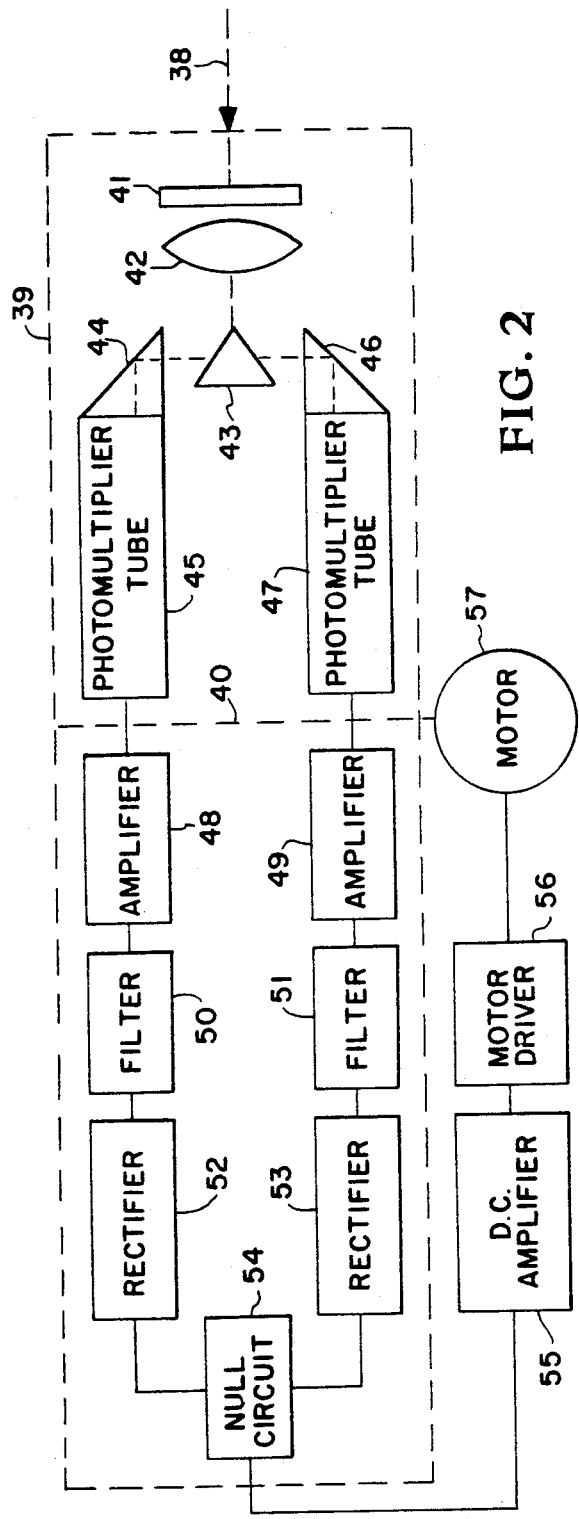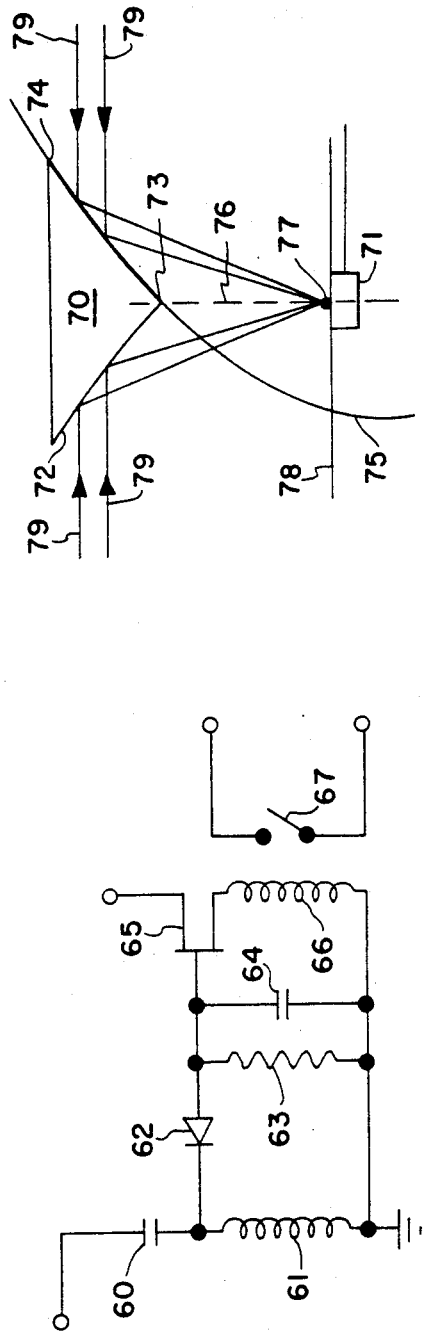

LASER COMMUNICATION SYSTEM FOR CONTROLLING SEVERAL FUNCTIONS AT A LOCATION REMOTE TO THE LASER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to a remote control system and more specifically concerns a multichannel laser remote control system that utilizes a unique 360° light collector.

The development and testing of experimental nuclear engines has demonstrated the need for mechanized removal of radioactive debris and waste from the test site due to the radiation hazard. Existing remotely controlled systems, none of which are entirely satisfactory, are of three basic types; radio frequency, acoustic and hardwire. Radio frequency systems pose a problem in that command signals interfere with engine control and monitoring devices; acoustic systems suffer from range limitations and are sensitive to ambient noise levels; and hardwire systems are restricted by cable movements.

It is the primary purpose of the invention to use a laser in a remote control system to eliminate the disadvantages of existing remote control systems. A unique 360° light collector is utilized in the system to increase its efficiency.

SUMMARY OF THE INVENTION

The laser remote control system that constitutes the invention consists of a transmitter, a receiver, and an auto-tracker. The transmitter includes a laser and a plurality of different frequency oscillators for modulating the laser beam with one or all of the different frequencies. The receiver includes a unique light collector and a tuned circuit for each of the different frequencies. When the light beam from the laser is modulated with a particular frequency, the corresponding tuned circuit produces a signal which actuates a switch causing the function associated with this particular frequency to be performed. The autotracker includes a reflector at the receiver, close to the collector for reflecting part of the laser beam back to the transmitter, and a tracker at the transmitter responsive to the reflected laser beam for keeping the laser pointed in the direction of the collector.

The unique light collector used in this invention consists essentially of a conical reflecting surface having a parabolic curvature. Light from a complete 360° in a plane striking the conical surface is reflected to a point where it is sensed by a photodetector.

BRIEF DESCRIPTION OF THE DRAWINGS

FIG. 2 is a block diagram of the auto-tracker used in the invention;

FIG. 3 is a schematic diagram of a tuned circuit and function relay used at the receiver of the invention; and FIG. 4 is a schematic drawing of a unique 360° light collector used in the invention.

DETAILED DESCRIPTION OF THE INVENTION

Figure 1:
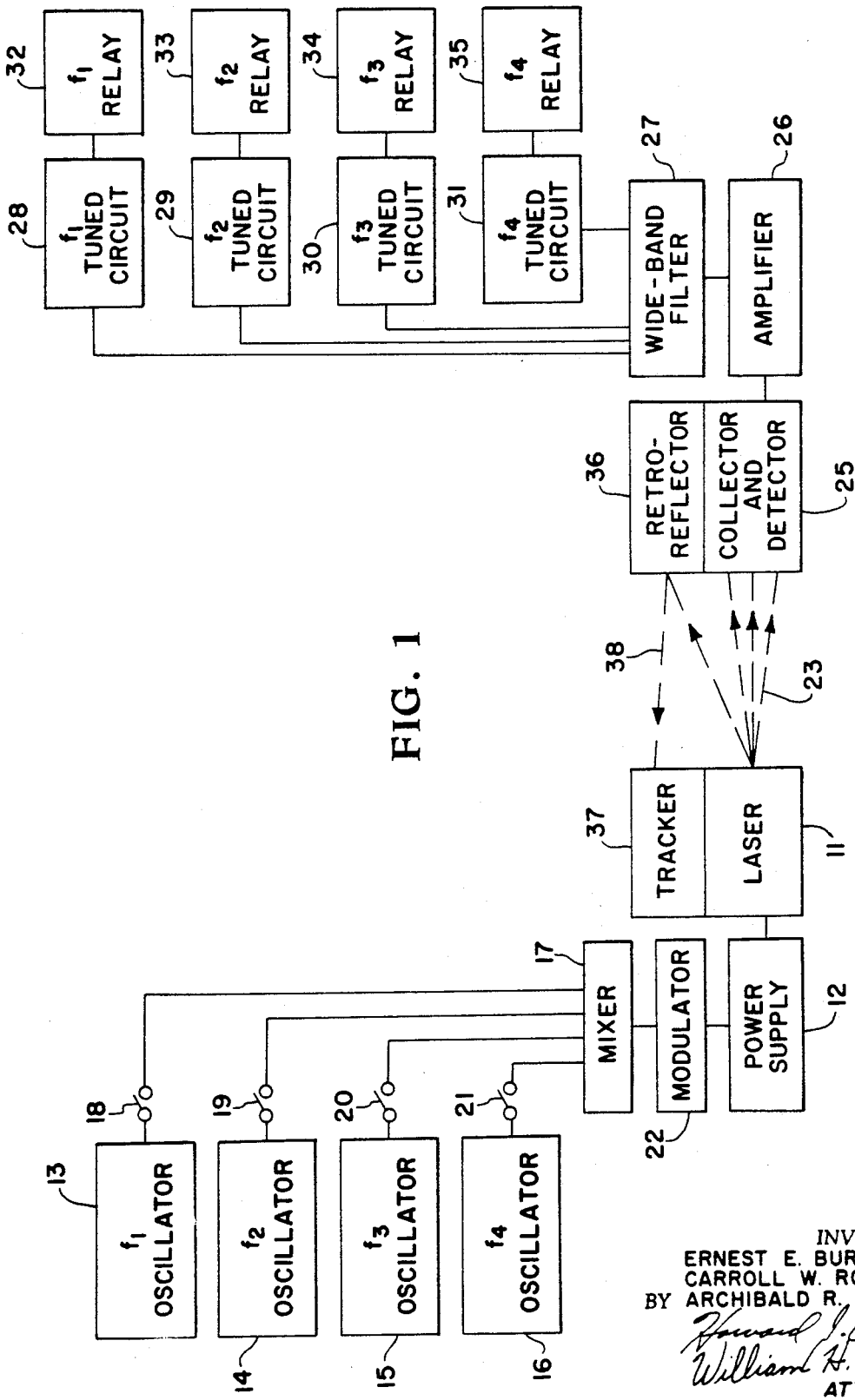
FIG. 1 is a block diagram of a preferred embodiment of the invention.

Turning now to the specific embodiment of the invention selected for illustration in the drawings, the number 11 designates a continuous wave He-Ne laser which is powered by a power supply 12. Oscillators 13, 14, 15 and 16 generate frequencies $f_1$, $f_2$, $f_3$ and $f_4$, respectively, which are selectively applied to a mixer 17 by switches 18, 19, 20 and 21. The output of mixer 17 is applied to a modulator 22 which modulates the power supply 12 and hence modulates the beam 23 produced by laser 11. Consequently beam 23 has frequency $f_1$ in it if switch 18 is closed, it has frequency $f_2$ in it if switch 19 is closed, it has frequency $f_3$ in it if switch 20 is closed and it has frequency $f_4$ in it if switch 21 is closed. The portion of the invention in FIG. 1 just described constitutes the transmitter.

The receiver consists essentially of a collector and detector 25 the details of which are disclosed in FIG. 4. The output of collector and detector 25 is amplified by an amplifier 26 and then applied to a wide band filter 27. The output of filter 27 is applied to tuned circuits 28, 29, 30 and 31. If the output of filter 27 has frequency $f_1$ in it, tuned circuit 28 produces a signal which actuates a relay 32; if the output of the filter has a frequency $f_2$ in it tuned circuit 29 produces a signal which actuates relay 33; if the output of the filter has frequency $f_3$ in it tuned circuit 30 produces signal which actuates a relay 34; and if the output of the filter has a frequency $f_4$ in it tuned circuit 31 produces a signal which actuates a relay 35. The circuitry used for each of tuned circuits 29–31 and relays 32–35 is disclosed in detail in FIG. 3. Each of the relays 32–35 which is controlled by one of the switches 18–21 at the transmitter, is connected in an electrical circuit to control a predetermined function. For example, the four relays shown could be used to control two d.c. motors in both the forward and backward directions.

In the operation of this invention, if one desires to actuate one of the relays, say relay 33, then all he has to do is close switch 19 at the transmitter. This applies frequency $f_2$ to mixer 17 whose output is applied to modulator 22 which modulates the power supply 12 with the frequency $f_2$. Hence, beam 23 of laser 11 has a frequency component $f_2$ contained in it. When the beam 23 is received by collector and detector 25, an electrical signal is produced which has a frequency $f_2$ contained in it. This signal is amplified and passes through the wide band filter 27 to tuned circuit 29. The resulting increased voltage caused by tuned circuit 29 actuates relay 33.

To keep laser 11 pointed in the direction of collector and detector 25 an auto-tracker consisting of a retro-reflector 36 and a tracker 37 is used. Retro-reflector 36 is mounted in close proximity with collector and detector 25 and reflects part of the energy in beam 23 back to tracker 37. Apparatus suitable for use as tracker 37 is shown in block diagram form in FIG. 2. Tracker 37 along with laser 11 are mounted on a turntable 39 which is free to rotate about an axis 40. The portion of beam 23 that is reflected is shown as beam 38 in FIG. 1. This beam passes through an interference filter 41 and a lens 42 to a beam-splitting prism 43. Prism 43 splits beam 38 into two beams one of which is reflected by prism 44 and detected by photomultiplier tube 45 and the other of which is reflected by a prism 46 and detected by a photomultiplier 47. Photomultiplier tubes 45 and 47 produce signals proportional to the beams reflected by prism 43. These signals are amplified by amplifiers 48 and 49, filtered by filters 50 and 51, and rectified by rectifiers 52 and 53. The outputs of the two rectifiers are applied to a null circuit 54, the output of which is amplified by amplifier 55 and applied to a motor driver 56 to drive motor 57. If prism 43 splits beam 38 into two equal beams then the null circuit 54 produces zero output and consequently motor 57 is not affected. However, if the beams produced by prism 43 are unequal, null circuit 54 produces an output which is applied to motor 57 to cause it to rotate turntable 39 about its axis 40 until the beams produced by beam splitting prism 43 are equal. Inasmuch as laser 37 is mounted on turntable 39, it also rotates with the turntable until the two beams are equal. Consequently beam 23 is always directed toward collector and detector 25.

A schematic diagram of circuitry suitable for either of the tuned circuits and relays in FIG. 1 is shown in FIG. 3. The output of the filter is applied to a capacitor 60 and an inductor 61 connected in series. The sizes of these two components are such that the circuit becomes resonant at a desired frequency and produces a large voltage at the junction of the two components. This voltage is rectified by a diode 62, a resistor 63 and a capacitor 64 and then applied to the base of a field-effects transistor 65. The field-effect transistor 65 is chosen because it does not load the tuned circuit. When a voltage is applied to the base of transistor 65, it becomes conductive and a voltage is produced across a relay coil 66 which actuates a relay switch 67 to control the desired function.

A schematic diagram of the collector and detector 25 in FIG. 1 is shown in FIG. 4. The collector is designated by the numeral 70 and the detector, which is a photodetector, is designated by the numeral 71. Collector 70 consists of a polished conical surface 72. This surface conforms to the surface formed by rotating segment 73-74 of a parabola 75 about an axis 76. Axis 76 passes through the focus 77 of parabola 75 and is perpendicular to parabolic axis 78. The sensing part of photodetector 71 is placed at the focal point 77. Hence all light 79 striking surface 72 from any direction in a plane parallel to parabolic axis 78 will be reflected to focal point 77 where it is detected by photodetector 71.

The advantages of this invention are numerous. Since the invention operates at optical wavelengths, it is immune to RF frequency and in turn cannot interfere with RF systems. There is no physical connection between transmitter and receiver thus eliminating any possibility of the equipment at the receiver becoming entangled in its own wires. The unique light collector of this invention provides a uniform sensitivity over a 360° field of view and focuses all light collected to a point. The method of demodulating the command signals permits use of a single simple amplifier for multiple command channels.

What is claimed as new and desired to be secured by Letter Patent of the United States is:

1. A remote control system comprising: a laser for producing a laser beam; means for producing a plurality of different frequencies; means for modulating said laser beam with selected ones of said different frequencies; light collector means at a remote location relative to said laser for collecting light in said light beam from 360° in a plane and focusing it on a point; said light collector means comprises a polished surface that conforms to a surface obtained by rotating a segment of one leg of a parabola about an axis through the focus of the parabola and perpendicular to the parabolic axis wherein every point on said segment is a distance from said focus equal to or greater than the distance along said perpendicular axis from said focus to a point on said parabola whereby all incident light on said surface from a complete 360° in plane parallel to said parabolic axis is brought to a common focus at the focus of said parabola; means for producing an electrical signal indicative of the light at said point; a separate switch associated with each of said plurality of different frequencies; and means responsive to said electrical signal for actuating each of said separate switches whose associated frequency is contained in said electrical signal whereby said plurality of switches can be controlled at said remote location by said modulating means.

2. A light collector comprising a polished surface that conforms to a surface obtained by rotating a segment of one leg of a parabola about an axis through the focus of the parabola and perpendicular to the parabolic axis wherein every point on said segment is a distance from said focus equal to or greater than the distance along said perpendicular axis from said focus to a point on said parabola whereby all incident light on said surface from a complete 360° in a plane parallel to said parabolic axis is brought to a common focus at the focus of said parabola.

3. A light collector according to claim 2 wherein said surface is a conical surface.

4. A light collector according to claim 2 including a photodetector for producing an electrical signal proportional to the light focused by said light collector.

* * * * *